US011321402B2

(12) United States Patent
Birkeland et al.

(10) Patent No.: US 11,321,402 B2
(45) Date of Patent: May 3, 2022

(54) INDEX STORAGE ACROSS HETEROGENOUS STORAGE DEVICES

(71) Applicant: Microsoft Technology Licensing, LLC, Redmond, WA (US)

(72) Inventors: Olaf René Birkeland, Oslo (NO); Geir Inge Kristengård, Skedsmokorset (NO); Lars Greger Nordland Hagen, Oslo (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 362 days.

(21) Appl. No.: 15/693,187

(22) Filed: Aug. 31, 2017

(65) Prior Publication Data

US 2018/0322207 A1 Nov. 8, 2018

Related U.S. Application Data

(60) Provisional application No. 62/502,355, filed on May 5, 2017.

(51) Int. Cl.
| | |
|---|---|
| *G06F 16/9535* | (2019.01) |
| *G06F 16/22* | (2019.01) |
| *G06F 16/24* | (2019.01) |
| *G06F 16/248* | (2019.01) |
| *G06F 16/2457* | (2019.01) |

(52) U.S. Cl.
CPC ......... *G06F 16/9535* (2019.01); *G06F 16/22* (2019.01); *G06F 16/24* (2019.01); *G06F 16/248* (2019.01); *G06F 16/24575* (2019.01); *G06F 16/24578* (2019.01)

(58) Field of Classification Search
CPC ............. G06F 16/9535; G06F 16/22; G06F 16/24578; G06F 16/24575; G06F 16/248; G06F 16/24
See application file for complete search history.

(56) References Cited

U.S. PATENT DOCUMENTS

| | | | |
|---|---|---|---|
| 7,007,035 B2 | 2/2006 | Kamath et al. | |
| 7,293,133 B1 | 11/2007 | Colgrove et al. | |
| 7,558,922 B2 * | 7/2009 | Murase | G06F 16/951 |
| | | | 711/137 |
| 9,043,530 B1 * | 5/2015 | Sundaram | G06F 3/068 |
| | | | 711/100 |
| 9,268,489 B2 | 2/2016 | Aizman et al. | |

(Continued)

FOREIGN PATENT DOCUMENTS

| | | |
|---|---|---|
| CN | 102567335 A | 7/2012 |
| WO | 2012032184 A1 | 3/2012 |

OTHER PUBLICATIONS

"International Search Report and Written Opinion Issued in PCT Application No. PCT/US18/026986", dated Jun. 26, 2018, 12 Pages.

(Continued)

*Primary Examiner* — Aleksandr Kerzhner
*Assistant Examiner* — Maher N Algibhah

(57) ABSTRACT

Indices or data structures used by an enterprise search system are stored across heterogenous storage devices. One or more characteristics associated with a data structure and one or more characteristics associated with a search query operator supported by the data structure are considered when determining which storage device should store each data structure.

20 Claims, 11 Drawing Sheets

(56) References Cited

U.S. PATENT DOCUMENTS

| | | | |
|---|---|---|---|
| 9,323,767 B2 | 4/2016 | Blanchflower et al. | |
| 9,565,253 B2 | 2/2017 | de Sene et al. | |
| 2003/0115207 A1* | 6/2003 | Bowman | G06Q 10/06 |
| 2004/0153479 A1 | 8/2004 | Mikesell et al. | |
| 2007/0136274 A1* | 6/2007 | Takuma | G06F 16/30 |
| 2009/0222321 A1* | 9/2009 | Liu | G06F 16/951 |
| | | | 705/7.31 |
| 2010/0174878 A1* | 7/2010 | Davis | G06F 3/0605 |
| | | | 711/161 |
| 2010/0281230 A1* | 11/2010 | Rabii | G06F 12/121 |
| | | | 711/165 |
| 2011/0010360 A1* | 1/2011 | Ayoub | G06F 16/24544 |
| | | | 707/719 |
| 2011/0153687 A1* | 6/2011 | Bacher | G06F 16/185 |
| | | | 707/812 |
| 2011/0258391 A1* | 10/2011 | Atkisson | G06F 11/108 |
| | | | 711/118 |
| 2012/0005419 A1* | 1/2012 | Wu | G06F 16/25 |
| | | | 711/105 |
| 2012/0166749 A1* | 6/2012 | Eleftheriou | G06F 3/0616 |
| | | | 711/165 |
| 2013/0226959 A1* | 8/2013 | Dittrich | G06F 16/2453 |
| | | | 707/769 |
| 2014/0012881 A1* | 1/2014 | Roesch | G06F 16/22 |
| | | | 707/792 |
| 2014/0344287 A1* | 11/2014 | Carvalho | G06F 16/22 |
| | | | 707/748 |
| 2015/0081709 A1* | 3/2015 | Fukuda | G06Q 90/00 |
| | | | 707/737 |
| 2015/0088856 A1* | 3/2015 | Hunter | G06F 16/24544 |
| | | | 707/714 |
| 2015/0310005 A1* | 10/2015 | Ryger | G06F 16/93 |
| | | | 707/706 |
| 2015/0317309 A1* | 11/2015 | Farrell | G06F 16/24578 |
| | | | 707/725 |
| 2016/0283560 A1* | 9/2016 | Chowdhury | G06Q 30/0601 |
| 2016/0313916 A1 | 10/2016 | Sivananainthaperumal et al. | |
| 2017/0094355 A1* | 3/2017 | McCarty | G06F 16/735 |
| 2017/0286311 A1* | 10/2017 | Juenemann | G06F 12/10 |

OTHER PUBLICATIONS

Wang, et al., "Tide-tree: A Self-Tuning Indexing Scheme for Hybrid Storage System", In Journal—World Wide Web, vol. 20, Issue 5, Dec. 21, 2016, 29 Pages.

"Top 10 performance tuning tips for relational databases", https://web.archive.org/web/20090914022901/http:/web.synametrics.com/top10performancetips.htm, Published on: Sep. 14, 2009, 7 pages.

* cited by examiner

| OPERATOR | FREQUENCY |
|---|---|
| Term | 100% |
| AND | 100% |
| ANDNOT | 96.76% |
| TermGroup | 70.27% |
| OR | 66.38% |
| PrefixTerm | 46.84% |
| Phrase | 9.50% |
| Ranges | 2.85% |
| ONEAR | 2.85% |
| XRANK | 2.47% |
| NEAR | 0.00% |

*FIG. 3*

INDEX STORAGE ACROSS HETEROGENOUS STORAGE DEVICES

CROSS-REFERENCE TO RELATED APPLICATION(S)

This application claims priority to U.S. Provisional Application No. 62/502,355 entitled "Index Storage Across Heterogenous Storage Devices," filed on May 5, 2017, of which the entire disclosure is hereby incorporated by reference in its entirety.

BACKGROUND

An enterprise search system searches information within an enterprise, such as a business, an organization, or a firm. An enterprise search system indexes data and documents from a variety of sources within the enterprise. Example sources include, but are not limited to, document management systems, intranets, email, instant messages, and databases. Through the enterprise search system, a defined group of search requestors (e.g., employees) is allowed to search for documents and information.

Several techniques have been developed to improve the speed of data retrieval during a search. One method is known as caching. In some implementations, a cache is a lower-latency storage device that stores data from an earlier search. The data stored in the cache are copied from data that are stored in a higher-latency storage device. The higher-latency storage device also stores other data (e.g., infrequently searched data). The cache allows the more frequently searched data to be retrieved faster in subsequent searches. However, caching does not improve the search speed for the less frequently searched data. Additionally, the cache does not increase the total storage capacity of a search system. With caching, the total storage capacity is determined by the storage capacity of the higher-latency storage device.

Another technique employs a multi-tiered indexing architecture that stores data on different storage devices based on how frequently the data is expected to be searched (e.g., how much time has passed since last search). For example, it may be assumed that two-year-old data is less frequently searched for than data that is ninety days old. The more recently-searched data are stored in a lower-latency storage device while data that has not been searched for a longer period of time are stored in a higher-latency storage device. In some instances, rarely searched data are stored in a very high-latency storage device. In such search systems, the speed of data retrieval is intentionally varied based on the expected search frequency of the data. Recently searched data is retrieved faster than prior searched data.

It is with respect to these and other general considerations that embodiments have been described. Also, although relatively specific problems have been discussed, it should be understood that the embodiments should not be limited to solving the specific problems identified in the background.

SUMMARY

This disclosure generally relates to storing indices or data structures used by an enterprise search system across heterogenous storage devices. The data structures are distributed across the heterogenous storage devices based on several characteristics. The characteristics can include, but are not limited to, an occurrence frequency of a search query operator that is supported by a data structure (e.g., may be used to access the data structure), a number of read operations that is performed on a data structure in response to the receipt of a search query operator, whether the read operations access sequential or random storage locations in a data structure, and/or a complexity of a data structure. Search results can be provided to a search requestor using a mix of more costly high performance (HP) storage devices and less costly low performance (LP) storage devices.

In one aspect, a system includes a low performance storage device and a high performance storage device. A first data structure is stored in the low performance storage device based on a first characteristic associated with a first data structure and a second characteristic associated with a first search query operator that is supported by the first data structure. A second data structure is stored in the high performance storage device based on a third characteristic associated with the second data structure and a fourth characteristic associated with a second search query operator that is supported by the second data structure.

In another aspect, a method of storing a data structure on a low performance storage device or on a high performance storage device includes determining if the data structure will be accessed by a search query operator that has an occurrence frequency that exceeds a threshold frequency, and when the occurrence frequency exceeds the threshold frequency, storing the data structure on the high performance storage device. When the occurrence frequency is less than the threshold frequency, a determination is made as to whether multiple read operations are needed to respond to a search query that includes the search query operator. When multiple read operations are not needed to respond to the search query, the data structure is stored in the low performance storage device.

In yet another aspect, a method includes receiving a search query and based on the search query, accessing at least one of: a first data structure stored in a low performance storage device or a second data structure stored in a high performance storage device. The first data structure is stored in the low performance storage device based on a first characteristic associated with the first data structure and a second characteristic associated with a first search query operator supported by the first data structure. The second data structure is stored on the high performance storage device based on a third characteristic associated with the second data structure and a fourth characteristic associated with a second search query operator supported by the second data structure.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

FIG. 3 illustrates an example list of search query operators and a usage percentage associated with each operator;

DETAILED DESCRIPTION

Figure 1:
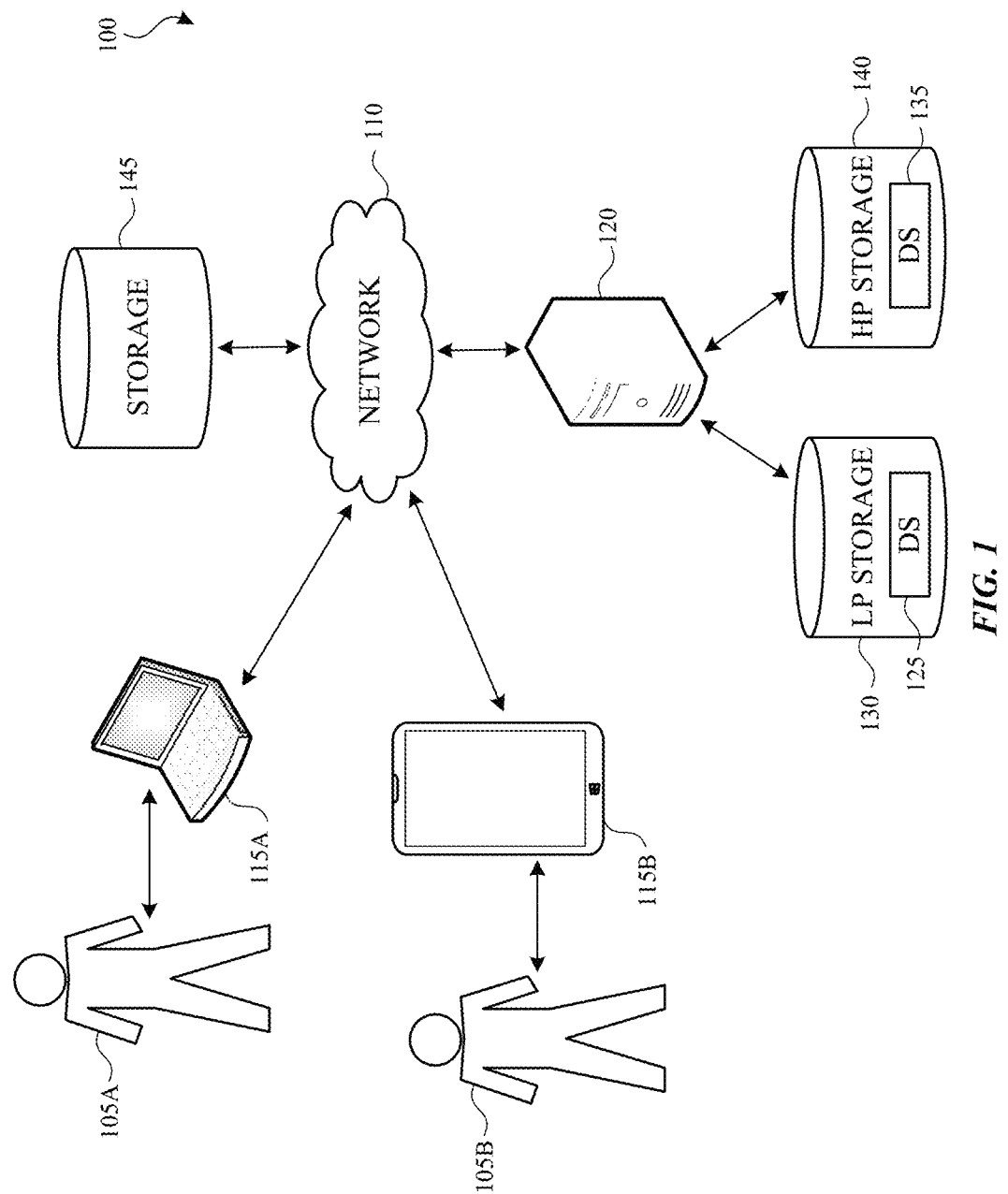
FIG. 1 illustrates a first example system that is suitable to store data structures across heterogenous storage devices.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

This disclosure generally relates to systems and methods that store indices or data structures across heterogenous storage devices. As described earlier, search results can be provided to a search requestor using a mix of more costly high performance (HP) storage devices and less costly low performance (LP) storage devices. Generally, a LP storage device is a higher-latency storage device and a HP storage device is a lower-latency storage device. Other attributes can be used to characterize an LP storage device and HP storage device. For example, in some embodiments, the bandwidth (e.g., the amount of data that can be transmitted in a fixed amount of time) of an HP storage device can be greater than the bandwidth of an LP storage device. Additionally or alternatively, the reliability and/or the resiliency of an HP storage device may be better than the reliability and/or the resiliency of an LP storage device. And, as noted earlier, an HP storage device is typically more expensive than an LP storage device. These are example attributes and are not intended to be limiting. In general, the functionality, operation, and/or performance of at least one attribute of an HP storage device is better, improved, upgraded, modernized, enhanced, superior, and/or advanced compared to the same attribute performance on an LP storage device.

The data structures are distributed across the heterogenous storage devices based on several characteristics. The characteristics can include, but are not limited to, an occurrence frequency of a search query operator that is supported by a data structure (e.g., may be used to access a data structure), an access pattern of a data structure, whether the read operations access sequential or random storage locations in a data structure, and/or a complexity of a data structure.

Although embodiments are described with reference to an HP storage device and an LP storage device, other embodiments are not limited to two heterogenous storage devices and/or to two types of heterogenous storage devices. Two or more storage devices can provide multiple tiers of performance levels. For example, in one embodiment the heterogenous storage devices may be high performance, medium performance, and low performance storage devices (e.g., three tiers of performance levels). Alternatively, the heterogenous storage devices may be very high performance, high performance, medium performance, low performance, and very low performance storage devices (e.g., five tiers of performance levels).

FIG. 1 illustrates a first example system that is suitable to store data structures across heterogenous storage devices. The system 100 is an enterprise communication system that provides search operations for search requestors 105A, 105B (collectively search requestor 105) over a network 110. The search requestors 105A, 105B are associated with an enterprise (e.g., business, firm, organization) in the representative embodiment. The search requestors 105A, 105B may be located at the same physical site or at different locations. The network 110 is illustrative of an enterprise-based network, for example, an intranet, and/or a distributed computing network, for example, the Internet, over which the various search requestors 105A, 105B may communicate with each other and with other computing systems.

In aspects, a client computing device 115, such as for example, the client computing device 115A and the client computing device 115B, may access the network 110 to perform a search or to cause a search to be performed by a server computing device 120. In some embodiments, a client computing device or a server computing device can be a search requestor. For example, a client computing device may run an automated script or bot that performs a search operation or causes a search operation to be performed.

When a search is performed by the server computing device 120, a client computing device 115 (e.g., client computing device 115A) transmits a search query to the server computing device 120. The server computing device 120 responsively performs the search, which includes accessing one or more indices or data structures (DS) 125 stored in an LP storage device 130 and/or accessing one or more indices or data structures (DS) 135 stored in an HP storage device 140. Example search operations are described in more detail in conjunction with FIGS. 6 and 7.

Any suitable storage device can be used for the LP storage device and for the HP storage device. One example of an LP device is a hard disk storage device and one example of an HP storage device is a solid state storage device.

The server computing device 120 may provide the search results to the client computing device that transmitted the search query (e.g., client computing device 115A). For example, the server computing device 120 can cause the search results to be displayed on the client computing device. The search requestor (e.g., search requestor 115A) may then select one or more content items from the search results, which causes the client computing device 115 (e.g., client computing device 115A) to transmit identifying information for the selected content item(s) to the server computing device 120. The server computing device 120 then responsively retrieves, accesses, or otherwise provides the content (e.g., documents, audio files, text files, video files, emails, text or instant messages, and the like) associated with the selected content items to the client computing device 115 (e.g., client computing device 115A). In some embodiments, the content can be stored in one or more storage devices (represented by storage device 145) that the server computing device 120 accesses through the network 120.

Embodiments disclosed herein store the indices or data structures used in an enterprise search operation across heterogenous storage devices. Search results can be provided to a requestor using a mix of more costly HP storage devices and less costly LP storage devices. For example, one or more data structures are stored in at least one LP storage device and one or more data structures are stored in at least one HP storage device. Each data structure is stored in a particular storage device based on one or more characteristics associated with a search query operator supported by the data structure and one or more characteristics associated with the data structure. For example, in one embodiment, a characteristic of a search query operator is the occurrence frequency of the search query operator and a characteristic of a data structure is an access pattern of the data structure. Additionally or alternatively, a characteristic of a data structure can be a complexity of the data structure. Other embodiments can use additional or different characteristics of the search query and/or of the data structure.

Figure 2A:
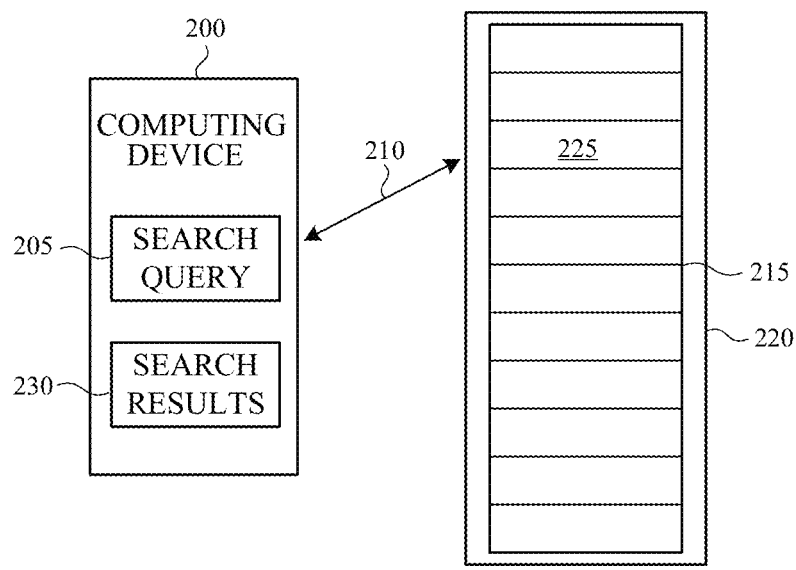
FIG. 2A depicts one example of an access pattern for a search query.

FIG. 2A depicts one example of an access pattern of a data structure. A computing device 200 receives a search query 205 that includes a search query operator. The search query 205 may be received from a search requestor through an interface of a search program running on the computing device 200 or on another computing device that is in communication with the computing device 200. The computing device 200 can be suitable for the computing devices described above, including the client computing device 115 and/or the server computing device 120.

Based on the search query 205, the computing device 200 performs a read operation 210 on the data structure 215 stored in the storage device 220. In the illustrated embodiment, the read operation 210 accesses one storage region or location 225 within the data structure 215. The computing device 200 produces the search results 230 based on the read operation 210.

Figure 2B:
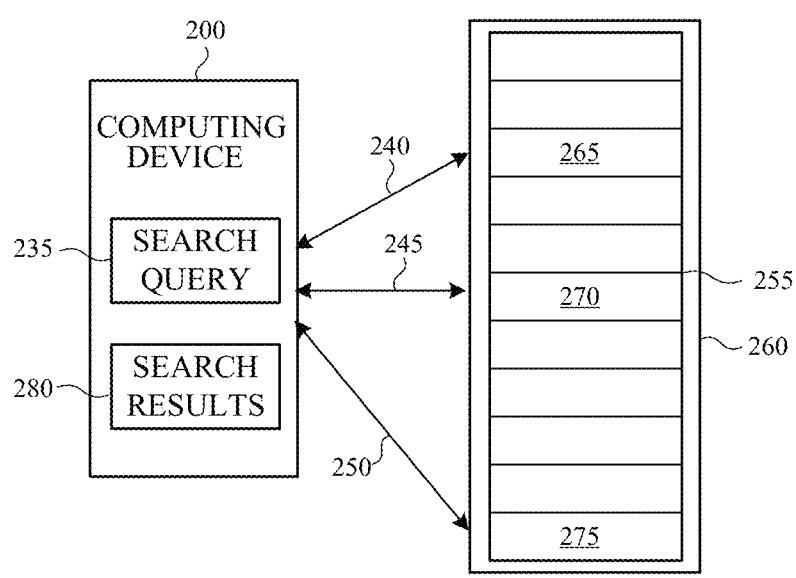
FIG. 2B illustrates another example of an access pattern for a search query.

FIG. 2B depicts another example of an access pattern of a data structure. The computing device 200 receives a search query 235 that includes a different search query operator, and based on the search query 235, the computing device 200 performs multiple read operations 240, 245, 250 on the data structure 255 stored in the storage device 260. In the illustrated embodiment, the read operation 240 accesses the storage location 265, the read operation 245 accesses the storage location 270, and the read operation 250 accesses the storage location 275. The storage locations 265, 270, 275 are non-sequential (e.g., random) storage locations because the storage locations 265, 270, 275 are positioned at random locations within the data structure 255. In other embodiments, the storage locations in the data structure 255 can be sequential (e.g., contiguous) storage locations. The computing device 200 produces the search results 280 based on the read operations 240, 245, 250.

An access pattern of a data structure includes the number of read operations performed in response to the receipt of a search query operator and the positions of the storage locations accessed during the read operation(s) (random or sequential). In the embodiment of FIG. 2A, the access of the single storage location 225 in a single read operation represents the access pattern of the data structure 215 for the search query 205. Similarly, in FIG. 2B, the multiple read operations that access multiple random storage locations (e.g., the storage locations 260, 265, 270 in any order) represent the access pattern of the data structure 255 for the search query 235. In some aspects, a data structure can be stored in an LP storage device when the data structure requires limited (e.g., one) read operations to respond to a search query. Additionally, a data structure that requires multiple read operations on sequential storage locations ("sequential read operations") to respond to a search query can be stored in an LP storage device or in an HP storage device while a data structure that requires multiple read operations on random storage locations ("random read operations") to respond to a search query may be stored in an HP storage device.

The complexity of a data structure includes the access pattern of the data structure, as well as other attributes. Example additional attributes include the size of the data structure and the amount of data retrieved or read out of a data structure in response to a search query operator. The access pattern or complexity of a data structure is a characteristic of a data structure that can be considered when determining whether the data structure should be stored in an HP storage device or in an LP storage device. Additionally, one or more characteristics of a search query operator supported by the data structure may be considered when determining where to store a data structure. Data structures that are accessed based on a search query operator that has a higher occurrence frequency may be stored in an HP storage device while data structures that are accessed based on a search query operator that has a lower occurrence frequency may be stored in an LP storage device.

FIG. 3 illustrates an example list of search query operators and an occurrence frequency associated with each search query operator. A search query can include one or more search query operators. The search query operators depicted in FIG. 3 are for illustrative purposes only. Other embodiments can employ additional or different search query operators.

In the illustrated example, the "term" search query operator 300 can be used for a keyword search and has an occurrence frequency of 100%. In some embodiments, data structures that store data (e.g., metadata) that will be read based on various term searches can be stored in HP storage devices.

In some embodiments, the "prefixterm" search query operator 305 can be implemented as a wildcard search. Example wildcard queries include, but are not limited to, "*character(s)", "character(s)*", or "character(s)*character(s)", where the asterisk represents one or more characters that precede, succeed, or are positioned between one or more additional characters. For example, a search query *rm will match words that have the character sequence "rm" at the end of the word. Example words include, but are not limited to, alarm, bookworm, snowstorm, and lukewarm.

The "prefixterm" search query operator 305 is associated with an occurrence frequency of 46.84%. Depending on what a frequency threshold is set at, a data structure that stores data (e.g., metadata) that will be read based on various prefixterm searches may be stored in either an LP or an HP storage device. The frequency threshold can be used to determine or influence where a data structure is stored based on the associated occurrence frequency. For example, if the frequency threshold is 75%, a data structure that stores data that will be read based on a prefixterm search query operator may be stored in an LP storage device because the occurrence frequency of the prefixterm search query operator is less than the occurrence threshold.

The "ranges" search query operator 310 is associated with an occurrence frequency of 2.85%. The "ranges" search query operator 310 causes a search to be performed for data (e.g., metadata) that falls within or outside of a given range of values (e.g., numbers). Given the low occurrence frequency of the "ranges" search query operator 410, a data structure that stores data that will be read based on ranges search queries may be stored in an LP storage device.

Figure 4:
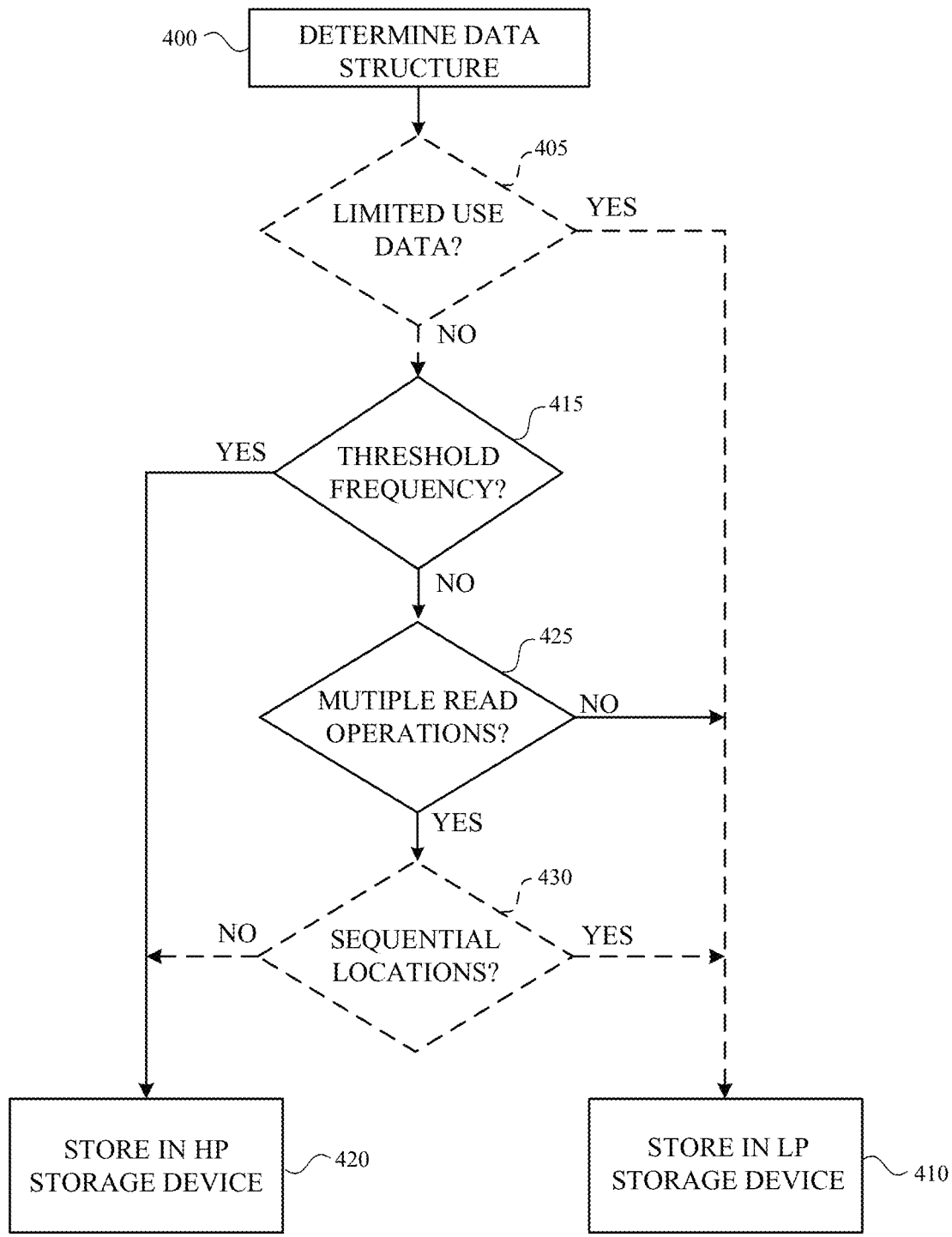
FIG. 4 is a flowchart depicting an example method of determining whether to store a data structure in a high performance storage device or in a low performance storage device.

FIG. 4 is a flowchart depicting an example method of determining whether to store a data structure in a high performance storage device or in a low performance storage device. In some embodiments, the data that is stored in the data structure is metadata that can include terms that are used in the content associated with the metadata and occurrences of the terms in the content. As described earlier, the content can include items such as documents, text, audio, and video files, intranet sites, text or instant messages, and emails, and the metadata stored in a data structure represents, identifies, or characterizes the content.

Initially, a data structure and the data to be stored in the data structure are determined and analyzed (block 400). The analysis of can include analyzing the access frequency of the data structure, which search queries are used to access the data, and the occurrence frequencies of the search queries. The occurrence frequency of each search query operator is determined as well as which data structures need multiple accesses for the search query operators.

A determination is then made at block 405 as to whether the data structure stores limited use data. If so, the process passes to block 410 where the data structure is stored in an LP storage device. In some embodiments, some data may be used for a limited time and/or for a limited purpose, such as when a user initially accesses an enterprise search system or when the enterprise search system is first executed on a computing device. Because the limited use data are used infrequently, the data structure that stores the limited use data can be stored in an LP storage device.

If the data structure does not store limited use data, the method continues at block 415 where a determination is made as to whether the data structure will be accessed by search query operators that have an occurrence frequency that exceeds (or equals or exceeds) a threshold frequency. If so, the process passes to block 420 where the data structure is stored in an HP storage device. If the search query operators have an occurrence frequency that is less than (or equals or is less than) the threshold frequency, the method continues at block 425 where a determination is made as to whether the data structure will require the performance of multiple read operations to respond to a search query. If not, the process passes to block 410 where the data structure is stored in an LP storage device.

If the data structure will require the performance of multiple read operations to respond to the search query, the method continues at block 430 where at determination is made as to whether the multiple read operations will access data stored in sequential locations within the data structure. If so, the process passes to block 410 where the data structure is stored in an LP storage device. If the data is stored in non-sequential (e.g., random) locations within the data structure, the method continues at block 420 where the data structure is stored in an HP storage device.

Block 405 and/or block 430 are optional (represented by dashed lines) and can be omitted in other embodiments. In embodiments where block 405 is omitted, the process begins at block 415. In embodiments where block 430 is omitted, the process passes from block 430 to block 420 when a determination is made at block 430 that the multiple read operations will not access data stored in sequential locations in a data structure.

Additionally, in some aspects, the order of the blocks shown in FIG. 4 can be arranged differently and/or the decisions at blocks 405, 415, 425, and/or 430 can lead to different blocks. For example, a data structure may be stored in an HP storage device when multiple read operations will not be performed in response to a search query (block 425). Additionally or alternatively, a data structure can be stored in an HP storage device when the multiple read operations will access data stored in sequential locations within the data structure (block 430).

The decisions of where to store a data structure are not fixed and can be based on the conditions or specifications of an enterprise search system. In some situations, the decisions are based on a compromise between the total cost of the heterogeneous storage devices in the search system and search efficiency and speed. In some implementations, the cost of the enterprise search system may be reduced because fewer expensive HP storage devices may be purchased and used in the enterprise search system.

The present invention allows the storage of the data structures to be tailored or optimized for an enterprise search system. As the use of the search system evolves over time, and/or as the behaviors of the search requestors change over time (e.g., search requestors 105A, 105B in FIG. 1), the storage of the data structures can evolve as well. A storage device that was stored in an LP storage device can be stored in an HP storage device (and vice versa).

Moreover, storing the data structures across heterogeneous storage devices can provide search requestors with similar search performances from the search system. It does not matter if a search requestor performs many search operations or few search operations, how often a search is performed for particular content, and whether a search is a recently performed search or not. The storage of the data structures on the heterogeneous storage devices based on the characteristics of the search query operators and the data structures allows an enterprise search system to be designed to produce customized search performances (e.g., such as search performances that are similar in the response time or in time needed to obtain search results).

Additionally or alternatively, compared to caching systems where the total storage capacity is the sum of the storage capacities of the LP storage devices, the present invention can increase the total storage capacity of a search system because the total storage capacity is the sum of the storage capacities of the HP and the LP storage devices.

Figure 5:
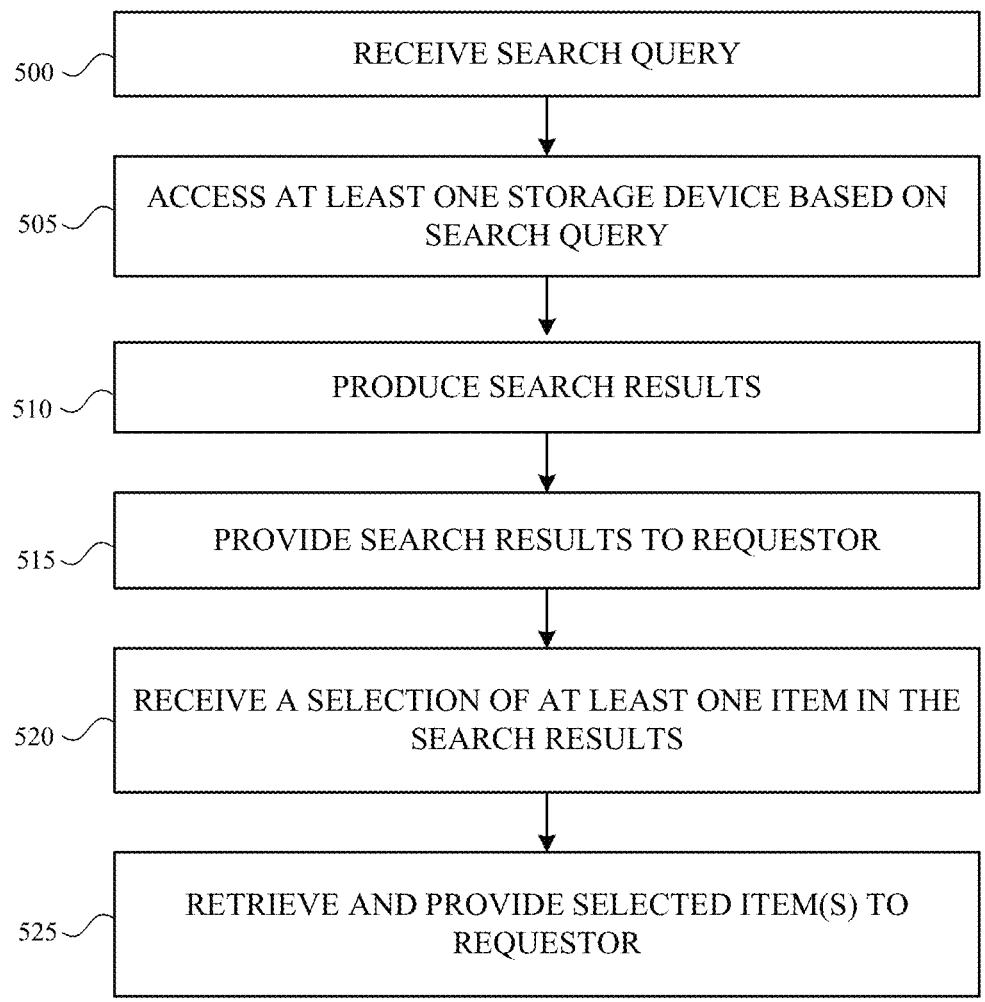
FIG. 5 is a flowchart depicting an example method of performing a search.

FIG. 5 is a flowchart depicting an example method of performing a search. Initially, a search query is received at block 500. The search query includes at least one search query operator (see FIG. 3). At block 505, at least one HP or LP storage device is accessed based on the search query. Search results are then produced at block 510.

Next, the search results are provided to the requestor (block 515). The search results include one or more content items that represent, identify, and/or characterize content that is accessible by the search requestor. Any suitable method of providing search results can be used. For example, in one embodiment, the search results are displayed on a client computing device (e.g., client computing device 115 in FIG. 1) as hyperlinks in an application (e.g., a web browser).

A selection of one or more content items in the search results is then received at block 520. For example, the requestor can select or "click on" one or more hyperlinks and the selected hyperlinks (or information identifying the selected hyperlinks) is received at block 520. The content associated with the selected content item(s) are then retrieved and provided to the search requestor (block 525).

The items in the search results can represent any suitable information or data that the requestor can search for and/or access using the enterprise search system. For example, the items may represent documents, text, audio, and video files, intranet sites, text or instant messages, and emails.

Figure 6:
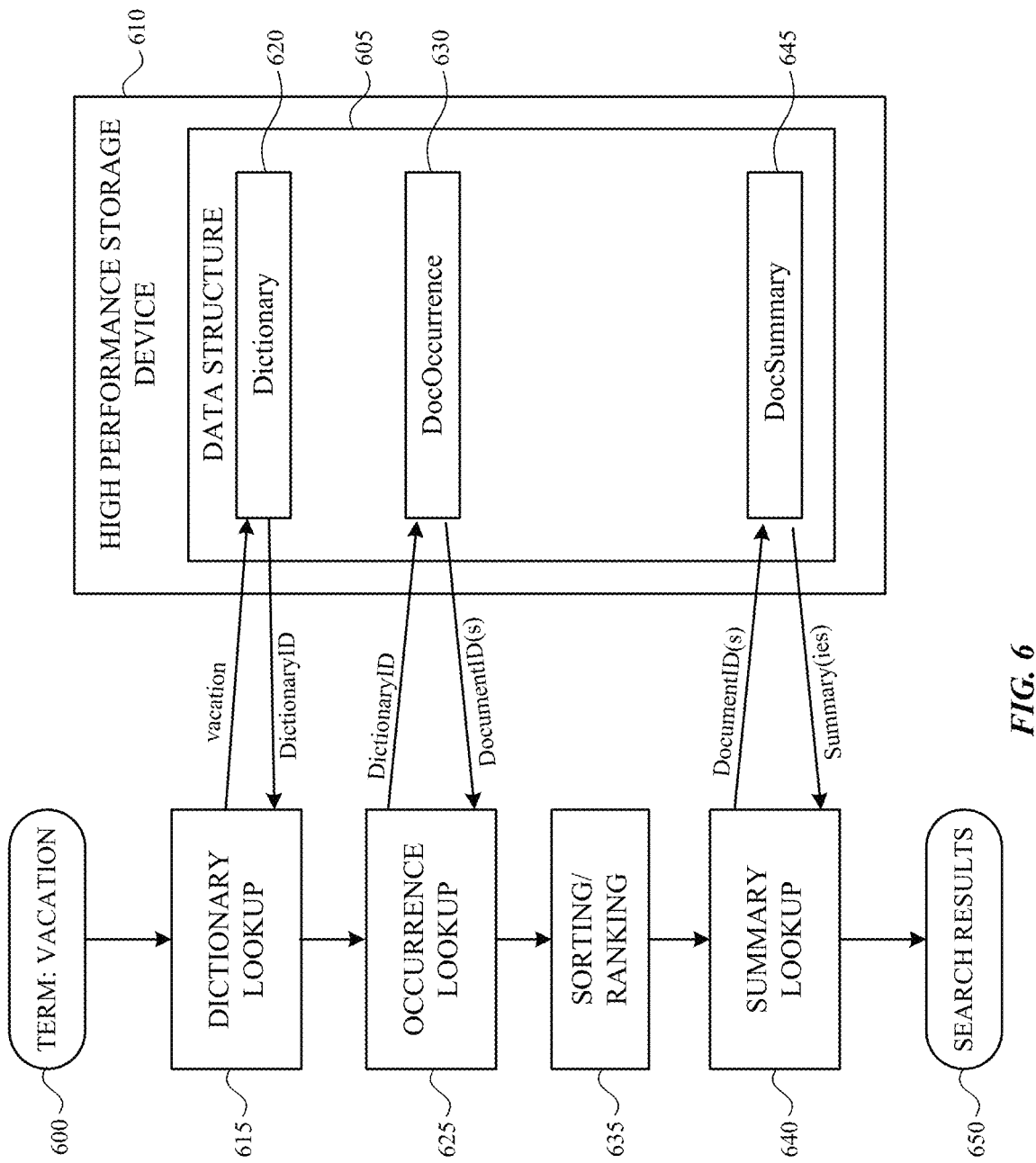
FIG. 6 is a process flow diagram illustrating a first example search.

FIG. 6 is a process flow diagram illustrating a first example search. The representative search is performed based on a "term" search operator (see FIG. 3), where the "term" is the word "vacation" (block 600). As disclosed with reference to FIG. 3, the occurrence frequency of a term search can be high (e.g., 100%), so the data structure 605 that is access for the "vacation" term search is stored in an HP storage device 610. The HP storage device 610 represents one HP storage device or multiple discrete HP storage devices. When the HP storage device 610 is discrete HP storage devices, the data sub-structures 620, 630, and/or 640 may be stored individually or in various combinations in a data structure stored in select HP storage devices. For example, the dictionary and DocOccurrence data sub-structures 620, 630 can be stored individually in one data structure or separately to discrete data structures on one discrete HP storage device and the DocSummary sub-structure 640 may be stored in a data structure on another discrete HP storage device.

First, a dictionary lookup operation 615 is performed using the word "vacation." The dictionary lookup operation 615 accesses the dictionary data sub-structure (Dictionary) 620 to determine if the word "vacation" is used in one or more content (e.g., documents, audio files, email, etc.) and if so, reads a dictionaryID for the word. Typically, a dictionary lookup operation 615 requires a single read operation from the dictionary data sub-structure 620 and results in the retrieval of a limited amount of data.

Next, an occurrence lookup operation 625 is performed using each dictionaryID. The occurrence lookup operation 625 accesses the occurrence data sub-structure (DocOccurrence) 630 to determine which content (e.g., documents, audio files, emails, etc.) include the word "vacation." The dictionaryID provides information on the storage location in the occurrence data sub-structure 630 for content that include the word "vacation." A documentID is read for each content that contains the word "vacation." In some embodiments, the occurrence data sub-structure 630 is a Boolean occurrence table. And similar to the dictionary lookup operation 615, the occurrence lookup operation 625 typically requires a single read operation from the occurrence data sub-structure 630 and results in the retrieval of a limited amount of data.

A sorting/ranking operation 635 is then performed to sort and rank the documentIDs in order of relevance. A subset of the ranked documentIDs (e.g., a given number of the highest ranked documentIDs such as the top ten) are provided to a summary lookup operation 635. The summary lookup operation 640 accesses document summary data sub-structure (Doc Summary) 645 using the subset of the ranked documentIDs to read a summary of the content (e.g., documents, audio files, emails, etc.) associated with the subset of the ranked documentIDs. Each summary includes information about a content, such as a title, author, creation data and/or revision date, and the like. Again, in some embodiments, the summary lookup operation 640 requires a single read operation from the summary data sub-structure 645 and results in the retrieval of a limited amount of data.

The summary or summaries are used to produce or generate the search results 650. The search results can then be provided to the requestor (see block 515 in FIG. 5), and the operations shown in blocks 520 and 525 may be performed.

Figure 7:
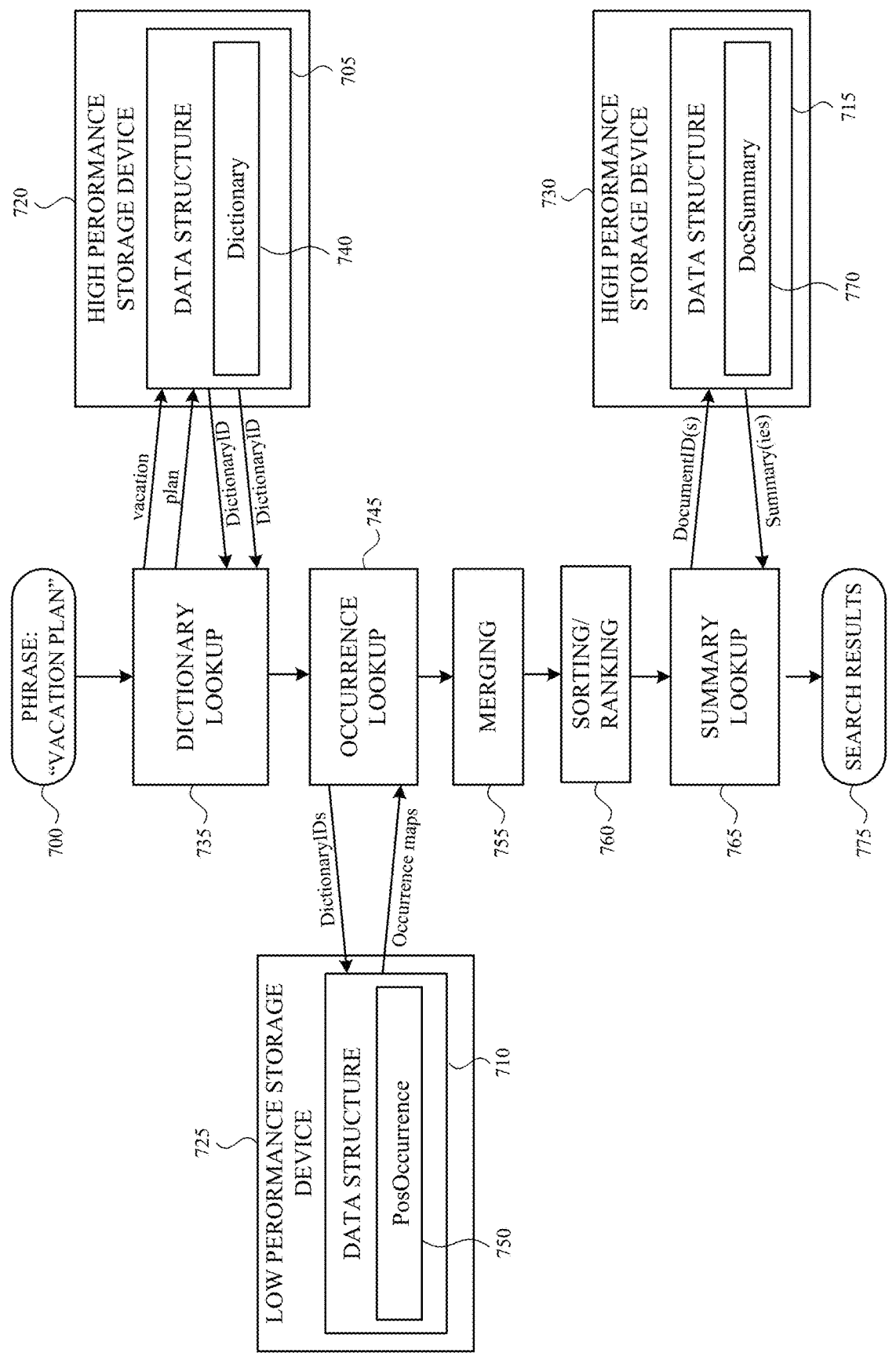
FIG. 7 is a process flow diagram depicting a second example search.

FIG. 7 is a process flow diagram illustrating a second example search. The representative search is performed based on a "phrase" search operator (see FIG. 3), where the "phrase" is "vacation plan" (block 700). As disclosed with reference to FIG. 3, the occurrence frequency of a phrase search operator can be low (e.g., 9.50%), so the data structures 705, 710, 715 are distributed across HP and LP storage devices 720, 725, 730, respectively. The HP storage devices 720, 730 can be one HP storage device or each HP storage device 720, 730 may be a discrete HP storage device. When the HP storage devices 720, 730 are one HP storage device, the data structures 705 and 715 may be one data structure or discrete data structures.

First, a dictionary lookup operation 735 is performed using the word "vacation" and the word "plan" separately. The dictionary lookup operation 735 is similar to performing two searches with term search operators, so the data structure 705 that stores the dictionary data sub-structure (Dictionary) 740 is stored on the HP storage device 720. The dictionary lookup operation 735 accesses the dictionary data sub-structure 740 to determine if the word "vacation" or the word "plan" is used in one or more content (e.g., documents, audio files, email, etc.) and if so, reads a dictionaryID for each word.

Next, an occurrence lookup operation 745 is performed using each dictionaryID. In general, the occurrence lookup operation 745 determines which content (e.g., documents, emails, video, text, or audio files, etc.) include both words "vacation" and "plan" by accessing the positional occurrence data sub-structure (PosOccurrence) 750. The dictionaryID provides information on the storage location in the positional occurrence data sub-structure 750 for content that includes the words "vacation" and "plan" and reads an occurrence map for each content. The positional occurrence data sub-structure 750 is less frequently used and is larger than the occurrence data sub-structure 630 in FIG. 6 because the positional occurrence data sub-structure 750 represents all occurrences of both words and the positions of the words within the content. The results from reading the positional occurrence data sub-structure 750 (e.g., the occurrence maps) typically retrieve a larger amount of data. For at least these reasons, the data structure 710 that stores the positional occurrence data substructure 750 is stored on an LP storage device 725.

A merging operation 755 is then performed. The merging operation 755 determines which content associated with the occurrence maps contain the phrase "vacation plan" (both words in the proper sequence). Thereafter, a sorting/ranking operation 760 is performed to sort and rank the occurrence maps/document IDs in order of relevance. A subset of the ranked documentIDs (e.g., a given number of the highest ranked documentIDs such as the top ten) are provided to a summary lookup operation 765.

Using a subset of the ranked documentIDs, which are associated with the content that includes the phrase "vacation plan," a summary lookup operation 765 is performed. The summary lookup operation 765 accesses document summary data sub-structure (DocSummary) 770 stored in the data structure 715 to read a summary of each content (e.g., documents, audio files, emails, etc.). Because multiple read operations are performed on random storage locations, the document summary data sub-structure 770, the data structure 715 that stores the document summary data 770 is stored on an HP storage device 730.

In other embodiments, depending on how many storage locations and/or data are read, a data structure that stores a document summary data sub-structure can be stored on an LP storage device. Thus, the document summary data sub-structure 645 in FIG. 6 and/or the document summary data sub-structure 770 in FIG. 7 may be stored on an LP storage device.

The summary or summaries are then used to produce or generate the search results 775. The search results may then be provided to the requestor (see block 515 in FIG. 5), and the operations shown in blocks 520 and 525 in FIG. 5 can be performed.

As should be appreciated, FIGS. 4-7 are each described for purposes of illustrating the present methods and systems and are not intended to limit the disclosure to a particular sequence of steps or a particular combination of hardware or software components.

Figure 8:
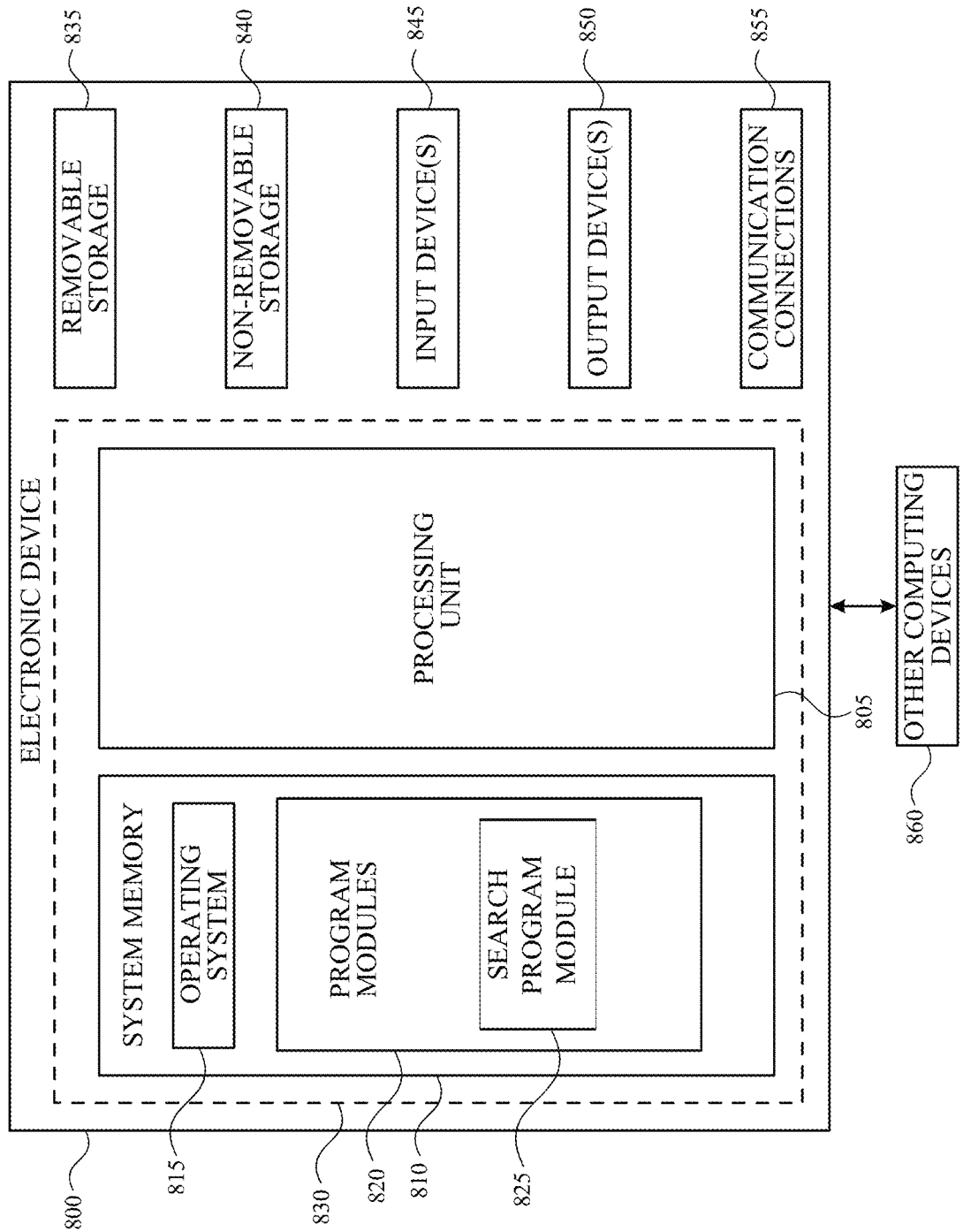
FIG. 8 is a block diagram illustrating example physical components of a computing device with which aspects of the disclosure may be practiced.
Figure 9A:
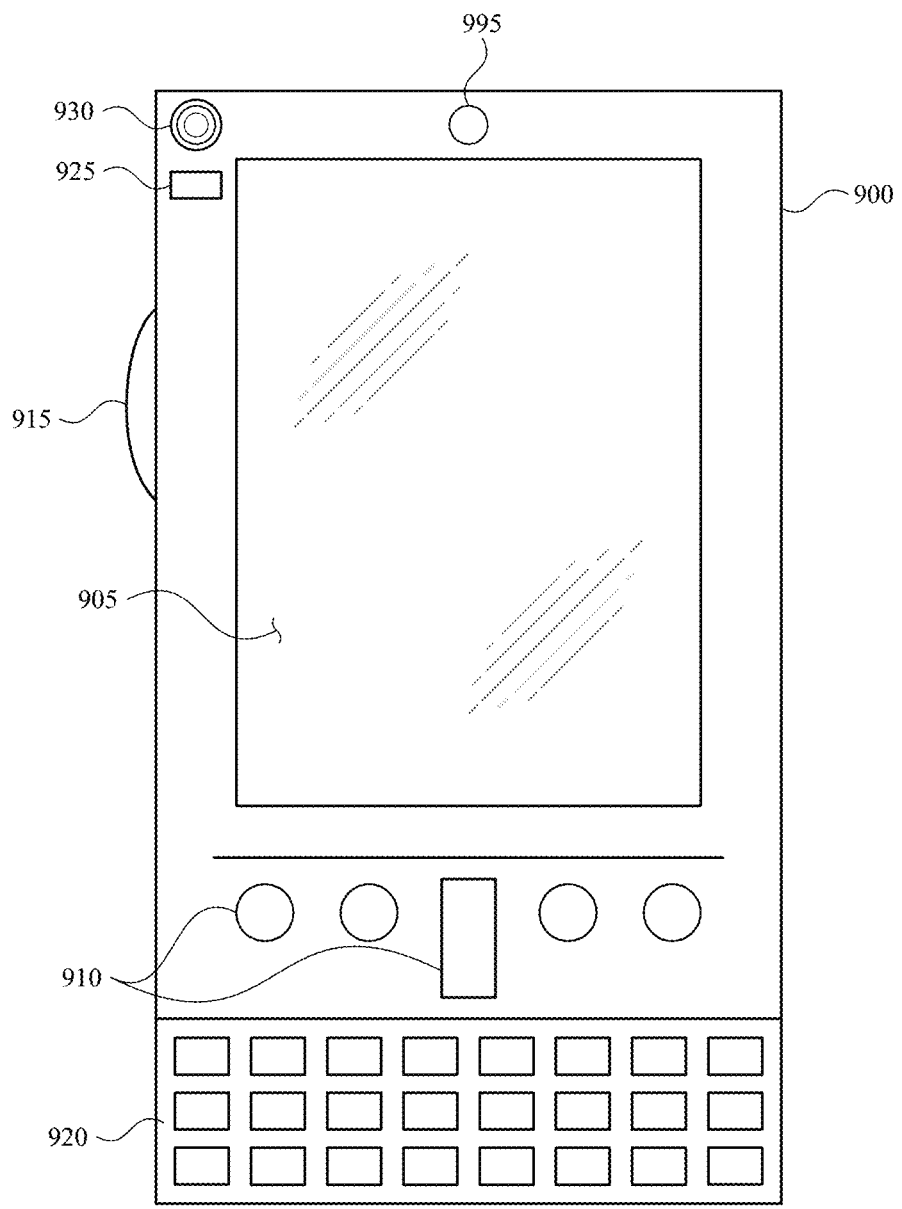
FIGS. 9A and 9B are block diagrams of a mobile computing device with which aspects of the present disclosure may be practiced.
Figure 9B:
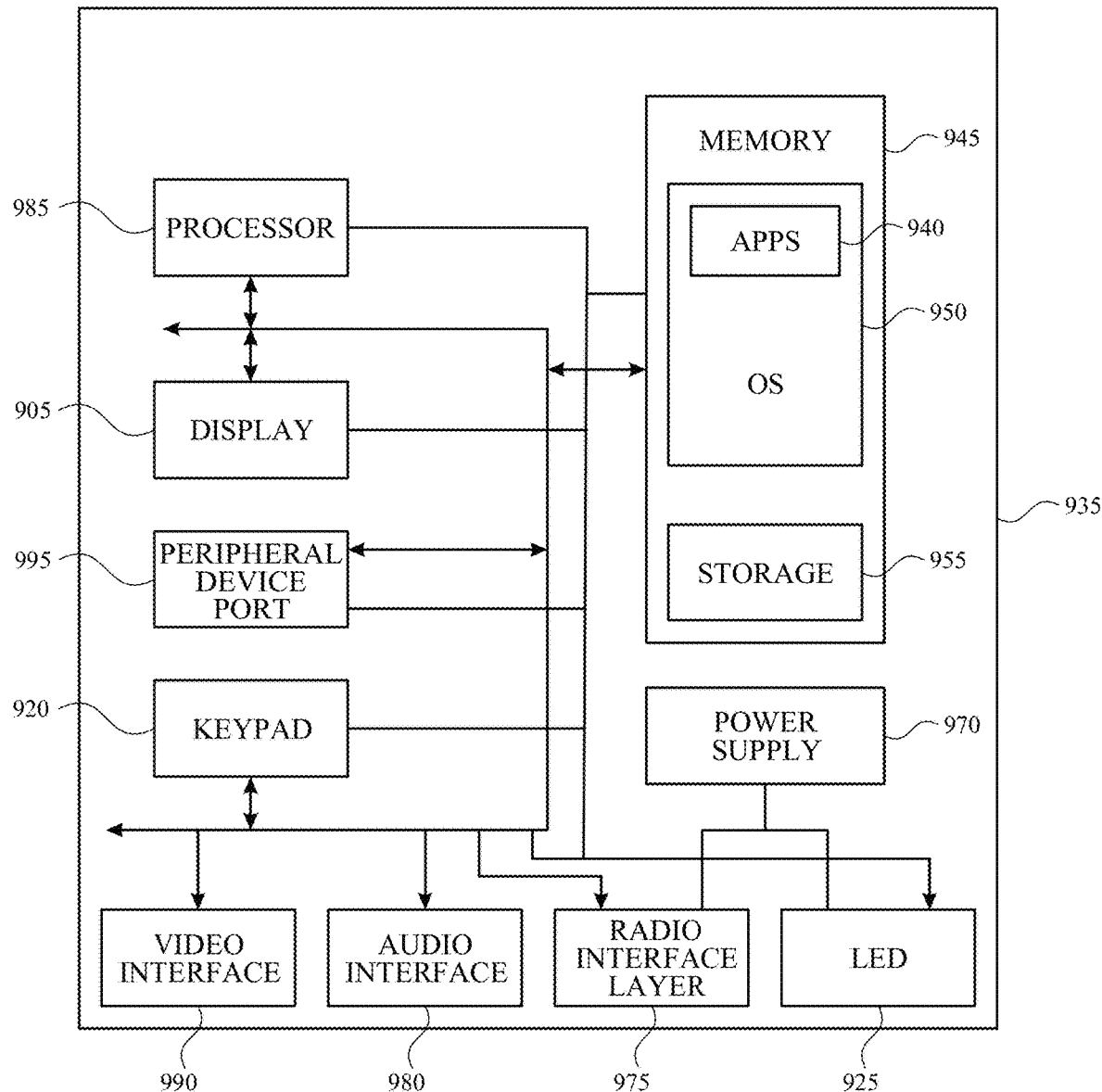
Figure 10:
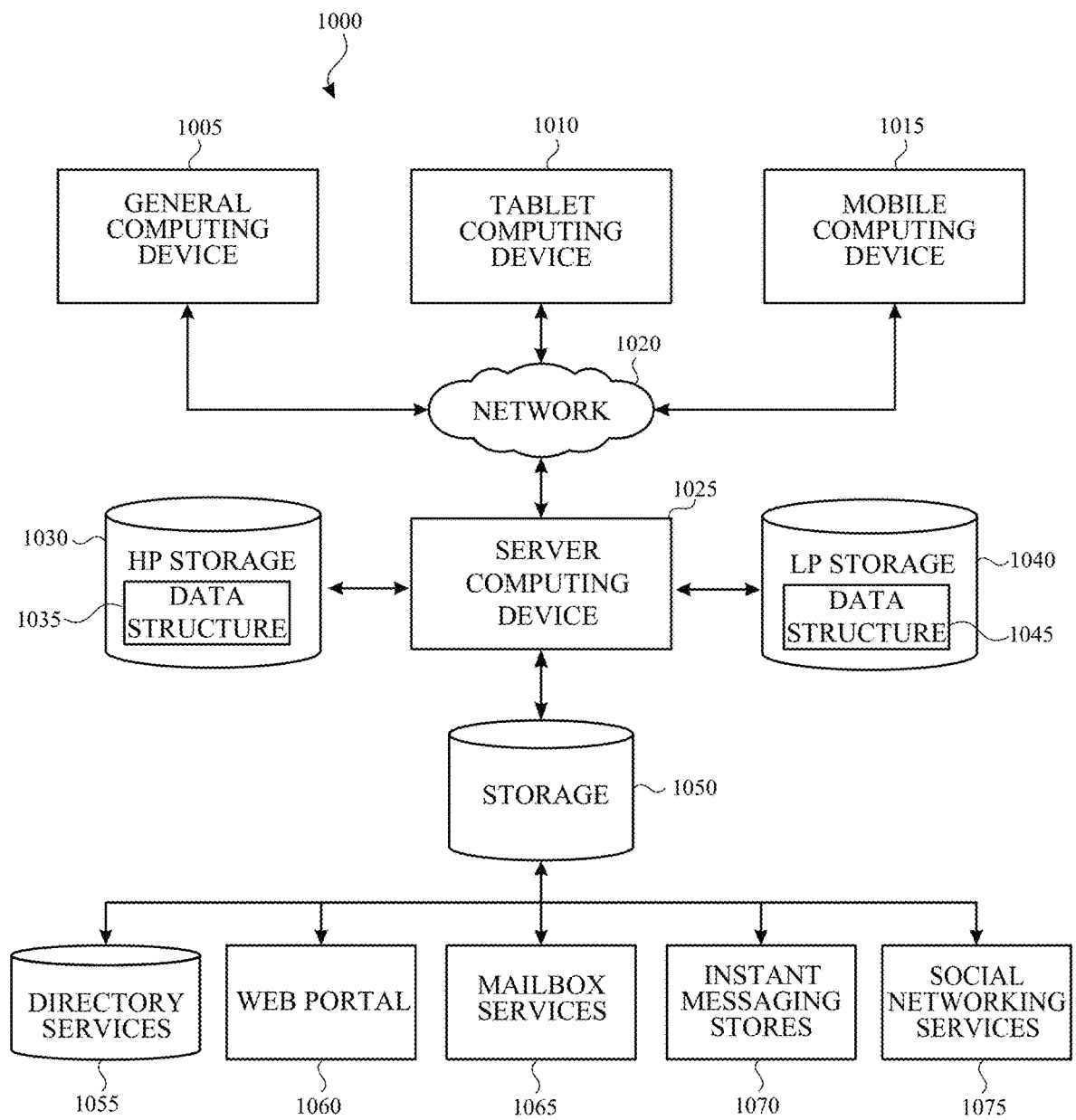
FIG. 10 is a block diagram of a distributed computing system in which aspects of the present disclosure may be practiced.

FIGS. 8-10 and the associated descriptions provide a discussion of a variety of operating environments in which aspects of the disclosure may be practiced. However, the devices and systems illustrated and discussed with respect to FIGS. 8-10 are for purposes of example and illustration and are not limiting of a vast number of electronic device configurations that may be utilized for practicing aspects of the disclosure, as described herein.

FIG. 8 is a block diagram illustrating physical components (e.g., hardware) of an electronic device 800 with which aspects of the disclosure may be practiced. The components described below may be suitable for the computing devices described above, including the client computing device 115 and the server computing device 120.

In a basic configuration, the electronic device 800 may include at least one processing unit 805 and a system memory 810. Depending on the configuration and type of the electronic device, the system memory 810 may comprise, but is not limited to, volatile storage (e.g., random access memory), non-volatile storage (e.g., read-only memory), flash memory, or any combination of such memories. The system memory 810 may include a number of program modules and data files, such as an operating system 815, one or more program modules 820 suitable for parsing received input, determining subject matter of received input, determining actions associated with the input and so on, and a search program module 820. While executing on the processing unit 805, the program modules 820 may perform and/or cause to be performed processes including, but not limited to, the aspects, as described herein.

The operating system 815, for example, may be suitable for controlling the operation of the electronic device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 830.

The electronic device 800 may have additional features or functionality. For example, the electronic device 800 may also include additional data storage devices (removable and/or non-removable) such as, for example, magnetic disks, optical disks, or tape. Such additional storage is illustrated in FIG. 8 by a removable storage device 835 and a non-removable storage device 840.

The electronic device 800 may also have one or more input device(s) 845 such as a keyboard, a trackpad, a mouse, a pen, a sound or voice input device, a touch, force and/or swipe input device, etc. The output device(s) 850 such as a display, speakers, a printer, etc. may also be included. The aforementioned devices are examples and others may be used. The electronic device 800 may include one or more communication connections 855 allowing communications with other electronic devices 860. Examples of suitable communication connections 855 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 810, the removable storage device 835, and the non-removable storage device 840 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 800. Any such computer storage media may be part of the electronic device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

FIGS. 9A and 9B illustrate a mobile electronic device 900, for example, a mobile telephone, a smart phone, wearable computer (such as a smart watch), a tablet computer, a laptop computer, and the like, with which embodiments of the disclosure may be practiced. With reference to FIG. 9A, one aspect of a mobile electronic device 900 for implementing and/or causing to be implemented the aspects is illustrated.

In a basic configuration, the mobile electronic device 900 is a handheld computer having both input elements and output elements. The mobile electronic device 900 typically includes a display 905 and one or more input buttons 910 that allow the user to enter information into the mobile electronic device 900. The display 905 of the mobile electronic device 900 may also function as an input device (e.g., a display that accepts touch and/or force input).

If included, an optional side input element 915 allows further user input. The side input element 915 may be a rotary switch, a button, or any other type of manual input element. In alternative aspects, mobile electronic device 900 may incorporate more or less input elements. For example, the display 905 may not be a touch screen in some embodiments. In yet another alternative embodiment, the mobile electronic device 900 is a portable phone system, such as a cellular phone. The mobile electronic device 900 may also include an optional keypad 920. Optional keypad 920 may be a physical keypad or a "soft" keypad generated on the touch screen display.

In various embodiments, the output elements include the display 905 for showing a graphical user interface (GUI) and a set of available templates, a visual indicator 925 (e.g., a light emitting diode), and/or an audio transducer 930 (e.g., a speaker). In some aspects, the mobile electronic device 900 incorporates a vibration transducer for providing the user with tactile feedback. In yet another aspect, the mobile electronic device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile electronic device 900. That is, the mobile electronic device 900 can incorporate a system (e.g., an architecture) 935 to implement some aspects. In one embodiment, the system 935 is implemented as a "smart phone" capable of running one or more applications (e.g., browser, e-mail, calendaring, contact managers, messaging clients, games, media clients/players, content selection and sharing applications and so on). In some aspects, the system 935 is integrated as an electronic device, such as an integrated personal digital assistant (PDA) and wireless phone.

One or more application programs 940, including a search program, may be loaded into the memory 945 and run on or in association with the operating system 950. Examples of other application programs include phone dialer programs, e-mail programs, personal information management (PIM) programs, word processing programs, spreadsheet programs, Internet browser programs, messaging programs, and so forth.

The system 935 also includes a non-volatile storage area 955 within the memory 945. The non-volatile storage area 955 may be used to store persistent information that should not be lost if the system 935 is powered down.

The application programs 940 may use and store information in the non-volatile storage area 955, such as search results, email or other messages used by an email application, and the like. A synchronization application (not shown) also resides on the system 935 and is programmed to interact with a corresponding synchronization application resident on a host computer to keep the information stored in the non-volatile storage area 955 synchronized with corresponding information stored at the host computer.

The system 935 has a power supply 970, which may be implemented as one or more batteries. The power supply 970 may further include an external power source, such as an AC adapter or a powered docking cradle that supplements or recharges the batteries.

The system 935 may also include a radio interface layer 975 that performs the function of transmitting and receiving radio frequency communications. The radio interface layer 975 facilitates wireless connectivity between the system 935 and the "outside world," via a communications carrier or service provider. Transmissions to and from the radio interface layer 975 are conducted under control of the operating system 950. In other words, communications received by the radio interface layer 975 may be disseminated to the application programs 940 via the operating system 950, and vice versa.

The visual indicator 925 may be used to provide visual notifications, and/or an audio interface 980 may be used for producing audible notifications via an audio transducer (e.g., audio transducer 930 illustrated in FIG. 9A). In the illustrated embodiment, the visual indicator 925 is a light emitting diode (LED) and the audio transducer 930 may be a speaker. These devices may be directly coupled to the power supply 970 so that when activated, they remain on for a duration dictated by the notification mechanism even though the processor 985 and other components might shut down for conserving battery power. The LED may be programmed to remain on indefinitely until the user takes action to indicate the powered-on status of the device.

The audio interface 980 is used to provide audible signals to and receive audible signals from the user (e.g., voice input such as described above). For example, in addition to being coupled to the audio transducer 930, the audio interface 980 may also be coupled to a microphone to receive audible input, such as to facilitate a telephone conversation. In accordance with embodiments of the present disclosure, the microphone may also serve as an audio sensor to facilitate control of notifications, as will be described below.

The system 935 may further include a video interface 990 that enables an operation of peripheral device 995 (e.g., on-board camera) to record still images, video stream, and the like. The captured images may be provided to the artificial intelligence entity advertisement system such as described above.

A mobile electronic device 900 implementing the system 935 may have additional features or functionality. For example, the mobile electronic device 900 may also include additional data storage devices (removable and/or non-removable) such as, magnetic disks, optical disks, or tape. Such additional storage is illustrated in FIG. 9B by the non-volatile storage area 955.

Data/information generated or captured by the mobile electronic device 900 and stored via the system 935 may be stored locally on the mobile electronic device 900, as described above, or the data may be stored on any number of storage media that may be accessed by the device via the radio interface layer 975 or via a wired connection between the mobile electronic device 900 and a separate electronic device associated with the mobile electronic device 900, for example, a server computing device in a distributed computing network, such as an intranet or the Internet (e.g., server computing device 120 in FIG. 1). As should be appreciated such data/information may be accessed via the mobile electronic device 900 via the radio interface layer 975 or via a distributed computing network. Similarly, such data/information may be readily transferred between electronic devices for storage and use according to well-known data/information transfer and storage means, including electronic mail and collaborative data/information sharing systems.

As should be appreciated, FIG. 9A and FIG. 9B are described for purposes of illustrating the present methods and systems and is not intended to limit the disclosure to a particular sequence of steps or a particular combination of hardware or software components.

FIG. 10 is a simplified block diagram of a distributed computing system in which aspects of the present disclosure may be practiced. The system 1000 may include a general computing device 1005 (e.g., personal computer), tablet computing device 1010, or mobile computing device 1015, as described above. The general computing device 1005, the tablet computing device 1010, and/or the mobile computing device 1015 may access one or more networks (represented by network 1020) to perform enterprise searches or to cause enterprise searches to be performed by one or more server computing devices (represented by server computing device 1025). As described earlier, the network 1020 is illustrative of an enterprise-based network, for example, an intranet, and/or a distributed computing network, for example, the Internet.

One or more HP storage devices can stored one or more data structures (represented by HP storage device 1030 and data structure 1035). Similarly, one or more LP storage devices can stored one or more data structures (represented by LP storage device 1040 and data structure 1045). In some aspects, based on search results, the general computing device 1005, the tablet computing device 1010, and/or the mobile computing device 1015 may receive (via the server computing device 1025) various types of information, data or content ("content") that is stored by the storage device 1050.

Additionally or alternatively, based on search results, the general computing device 1005, the tablet computing device 1010, and/or the mobile computing device 1015 can receive various types of information or content that is transmitted from a directory service 1055, a web portal 1060, mailbox services 1065, instant messaging stores 1070, and/or social networking services 1075. By way of example, the aspects described above may be embodied in a general electronic device 1005 (e.g., personal computer), a tablet electronic device 1010 a mobile electronic device 1015 (e.g., a smart phone), and/or a server computing device 1025. Based on search results, any of these embodiments of the electronic devices may obtain content from the storage device 1050.

As should be appreciated, FIG. 10 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system, comprising:
a low performance storage device storing a first data structure, the first data structure stored in the low performance storage device based on a first characteristic associated with the first data structure and a second characteristic associated with a first search query operator type supported by the first data structure, wherein the first characteristic comprises a first access pattern of the first data structure and the second characteristic comprises a frequency of use of the first search query operator type for search operations; and
a high performance storage device storing a second data structure, the second data structure stored in the high performance storage device based on a third characteristic associated with the second data structure and a fourth characteristic associated with a second search query operator type supported by the second data structure, wherein the third characteristic comprises a second access pattern of the second data structure and the fourth characteristic comprises a frequency of use of the second search query operator type for search operations.

2. The system of claim 1, further comprising:
a processing unit; and
a memory storing computer readable instructions which, when executed by the processing unit performs a method, comprising:
receiving a search query; and
performing a search operation based on the search query, wherein at least one of the first data structure or the second data structure is accessed during the search operation.

3. The system of claim 1, wherein the first access pattern is based on:
a number of read operations to be performed in response to a receipt of a first search query corresponding to the first search query operator type; and
when the number of read operations is greater than one, a position of a storage location accessed during each read operation.

4. The system of claim 1, wherein the second access pattern is based on:
- a number of read operations to be performed in response to a receipt of a second search query corresponding to the second search query operator; and
- when the number of read operations is greater than one, a position of a storage location accessed during each read operation.

5. The system of claim 1, wherein the first data structure is stored in the low performance storage device based further on a complexity of the first data structure.

6. The system of claim 1, wherein the second data structure is stored in the high performance storage device based further on the third characteristic associated with the second data structure comprises a complexity of the second data structure.

7. The system of claim 1, wherein the high performance storage device comprises a solid state storage device and the low performance storage device comprises a hard disk storage device.

8. The system of claim 1, wherein the first search query operator and the second search query operator each comprises one of:
- a term operator for a keyword search;
- an AND operator;
- an OR operator;
- a phrase operator; or
- a prefix term operator.

9. A method comprising:
- receiving a search query that is based on a search query operator;
- based on the search query, accessing at least one of:
  - a first data structure stored in a low performance storage device, wherein the first data structure is stored in the low performance storage device based at least on a first access pattern of the first data structure and a frequency of use of the search query operator for search operations; or
  - a second data structure stored in a high performance storage device, wherein the second data structure is stored in the high performance storage device based at least on a second access pattern of the second data structure and a frequency of use of the search query operator for search operations.

10. The method of claim 9, wherein the first access pattern is based on:
- a number of read operations to be performed in response to a receipt of the search query; and
- when the number of read operations is greater than one, whether the read operations are sequential or random read operations.

11. The method of claim 9, wherein the second access pattern is based on:
- a number of read operations to be performed in response to a receipt of the search query; and
- when the number of read operations is greater than one, whether the read operations are sequential or random read operations.

12. The method of claim 9, further comprising:
- retrieving multiple summaries of content based on a result of the search query; and
- ranking the multiple summaries in order of relevance.

13. The method of claim 12, further comprising:
- providing a subset of the ranked multiple summaries;
- causing the subset to be displayed;
- receiving a selection of a summary in the subset; and
- retrieving a content associated with the selected summary.

14. The method of claim 9, wherein the search query operator comprises one of:
- a term operator for a keyword search;
- an AND operator;
- an OR operator;
- a phrase operator; or
- a prefix term operator.

15. A method, comprising:
- determining if a data structure will be accessed based on a search query that is associated with a type of a search query operator that has a frequency of use for search queries that exceeds a threshold frequency;
- when the frequency of use of the search query operator for search queries exceeds the threshold frequency, storing the data structure on a high performance storage device;
- when the frequency of use of the search query operator for search queries is less than the threshold frequency, determining if multiple read operations are needed to respond to a search query that is based on the search query operator; and
- when multiple read operations are not needed to respond to the search query, storing the data structure on the low performance storage device.

16. The method of claim 15, further comprising:
- determining if the data structure stores limited use data; and
- when the data structure stores limited use data, storing the data structure on the low performance storage device.

17. The method of claim 15, further comprising when multiple read operations are needed to respond to the search query, storing the data structure on the high performance storage device.

18. The method of claim 15, further comprising:
- when multiple read operations are needed to respond to the search query, determining if the multiple read operations comprise sequential read operations;
- when the multiple read operations comprise sequential read operations, storing the data structure on the low performance storage device; and
- when the multiple read operations comprise random read operations, storing the data structure on the high performance storage device.

19. The method of claim 15, wherein the search query operator comprises one of:
- a term operator for a keyword search;
- an AND operator;
- an OR operator;
- a phrase operator; or
- a prefix term operator.

20. The method of claim 15, wherein the high performance storage device comprises a solid state storage device and the low performance storage device comprises a hard disk storage device.

* * * * *